Jan. 5, 1954  A. T. PITMAN  2,665,165
REMOVABLE COMBINATION CANOPY FRAME
AND SEAT UNIT FOR MOTOR VEHICLES
Filed Dec. 9, 1949  2 Sheets-Sheet 2
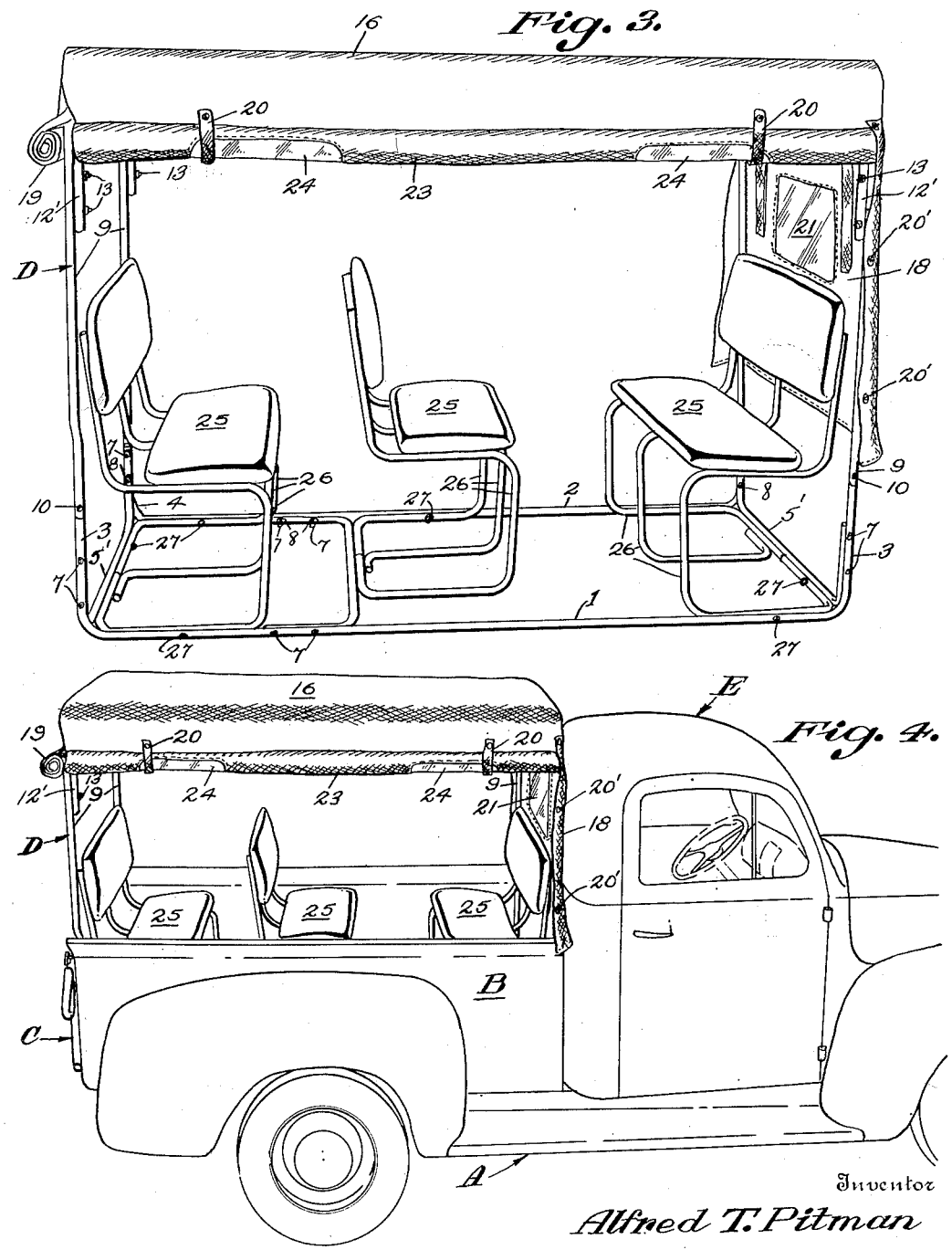
Inventor
Alfred T. Pitman
By Shreve, Crowe & Gordon
Attorneys Patented Jan. 5, 1954

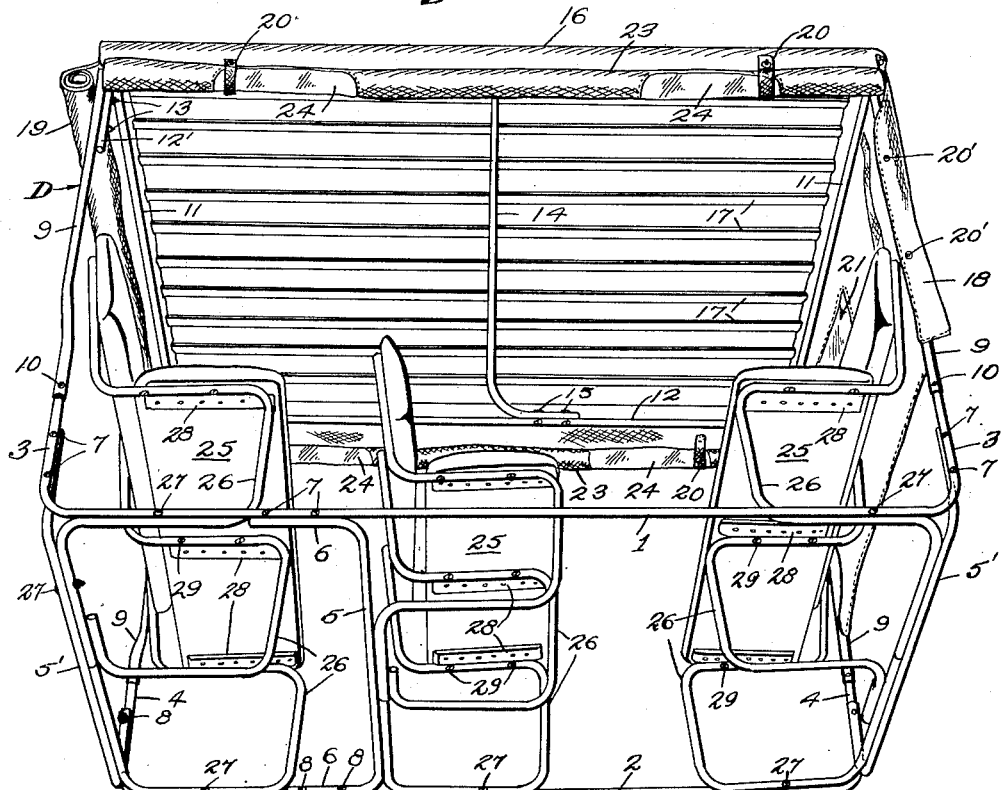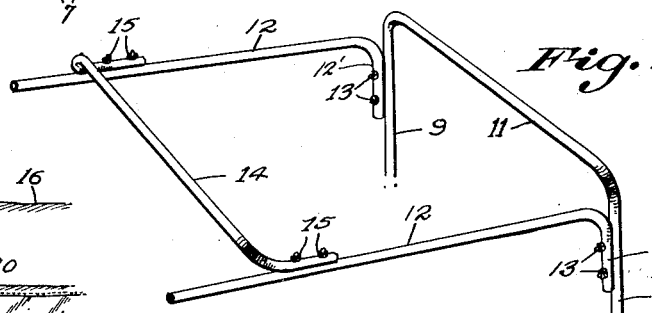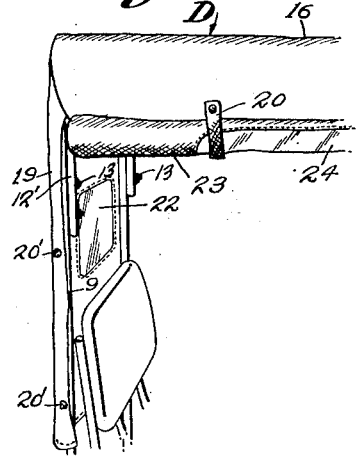

2,665,165

UNITED STATES PATENT OFFICE 2,665,165

REMOVABLE COMBINATION CANOPY FRAME
AND SEAT UNIT FOR MOTOR VEHICLES

Alfred T. Pitman, Atlanta, Ga., assignor to Dixie
Tallyho, Inc., Fairburn, Ga., a corporation of
Georgia Application December 9, 1949, Serial No. 132,103

3 Claims. (Cl. 296—28)

The present invention relates to a convertible unit for bodies of light weight trucks and similar vehicles having open load-carrying bodies of substantially standard dimensions. Such pick-up trucks of ratings of one-half to three-quarters ton, and one ton, having an enclosed driver's cab and open pick-up load-carrying body, and amenable to the accessory of the present invention, independently of the particular make of the truck.

More particularly, the present invention has for its object the provision of a unit which may be mounted in the body of a truck and retained by the sides and tail gate thereof, and which may be readily mounted and demounted as a unit, and which is adapted to convert the truck into a covered passenger-carrying vehicle somewhat similar to a station wagon type of vehicle.

A still further object of the invention is to provide a light-weight unit of a size adapted to be received in the open load-carrying body of a pick-up truck, and which is provided with a plurality of seats for enabling a number of passengers to be transported by the truck for any desired purpose.

A still further object of the invention is to provide an accessory of the above indicated character in which the seats are demountably secured so that one or all of the seats may be removed from the unit and remounted thereon as may be desired.

A still further object of the invention is to provide a convertible unit of the above indicated character which is protected by a strong reinforced cover or top, conveniently made of waterproof duck, canvas, or other tarpaulin-like fabric suitably reinforced with rigid ribs of wood or metal (preferably the former for lightness of weight) forming a satisfactory top for the truck body when the seats are removed, for trucking purposes, or when being used for the transportation of passengers.

A still further object of the invention is to provide a covered unit of the above-indicated type that is provided with flexible side curtains of water-proof fabric which may be rolled up out of the way when not in use, and which are provided with transparent windows composed of flexible sheets of plastic or like material which enables admission of light into the enclosure resulting from the lowering of the side curtains while maintaining the said enclosure weather-tight.

A still further object of the invention is to provide aligned transparent window members in the front and rear curtains of the unit so that the driver of the truck will have an unobstructed rearward view through the unit when the curtains are down.

A still further object of the invention is to provide a convertible unit of the above-indicated construction which may be shipped in knocked down condition in a compact carton or other shipping container.

Further objects of the invention will become apparent as the description proceeds, and the features of novelty will be pointed out in particularity in the appended claims.

The invention will be understood more readily by reference to the accompanying drawings, in which:

Fig. 1 is a perspective view of the unit of the present invention, resting on one of the lower frame members, and showing the lower sides of the seats and top.

Fig. 2 is a fragmentary perspective view of a portion of the upper frame of the unit, with the top removed.

Fig. 3 is a side perspective view of the accessory or unit of the present invention.

Fig. 4 is a perspective of a pick-up truck and unit mounted in the load carrying open body thereof, and converting said truck into a covered passenger carrying vehicle.

Fig. 5 is a fragmentary view of the top and lowered rear curtain member of the unit, showing the window therein which registers with a similar window in a front curtain member when the curtains are down.

Briefly the convertible structure forming the subject matter of this invention comprises a tubular frame constructed to form a supporting base, side and top frame elements constituting top supporting bows and removable seats carried by the base members embraced in a single unit of light weight which can be readily loaded on and unloaded from a truck by one person. Said base being in the form of tubular runners which act as a sled, to allow easy movement of the unit on the ground and ready positioning in a truck. Primarily, said unit is designed to convert a substantially standard open-body pick-up truck into a covered carrying vehicle adapted to transport workmen to and from work and to protect clothing, lunches, paraphernalia, and the like from the elements and by removal of the seats to constitute a closed vehicle adapted to be used for the transportation and protecting of, particularly, perishable freight from the elements. Said tubular construction forming a rigid yet light weight frame structural unit having a covered top and adjustable side curtains, said unit being adapted to function as a lawn or beach cabana and the seats when removed constituting beach or porch spring-type seats.

Referring more particularly to the drawings, A represents a standard type of light weight truck having the usual open load-carrying body B, comprising a bottom, and upright side and end members, the rear end of which constitutes a hinged or the like tail gate C. The present invention comprises a convertible knock down unit D which has the construction to be hereinafter set forth, and which is clear from the drawings, the unit being adapted to be positioned in the open body B of the truck, substantially filling its load-carrying compartment when the forward end of the unit abuts the rear of the driver's cab E of the truck. The fact that the unit substantially is coextensive with the length and width of the load-carrying compartment of the truck when the tail gate C is closed, prevents sliding of the unit during operation of the truck.

The convertible unit D of the invention comprises a frame composed of detachable interconnected members. The frame members being preferably of metal, and which are hollow tubes in order to have strength and to lessen weight. The bottom portion of the frame comprises parallel, spaced tubular bars 1 and 2, having their ends bent into corresponding parallel end portions 3 and 4 which are designed to form parallel upstanding ends when the frame is assembled. The bottom frame bars 1 and 2 are spaced apart by an intermediate reinforcing spacing bar 5, the ends of which are turned as indicated at 6 to engage the inner portions of the bars 1 and 2, and to be secured thereto by bolts 7, which are passed through registering holes in the adjacent parts, and secured by nuts 8. The bars 1 and 2 are bracingly spaced at their ends by similar bars 5' the bent ends 6 of which engage the inner surfaces of the end portions 3 and 4 and are secured thereto by bolts 7 and nuts 8.

The upstanding ends 3 and 4 of the bottom frame bars 1 and 2 are received telescopically in the lower ends of the vertically extending bars 9, and removably secured thereto by bolts or screws 10. Each pair of said bars 9 are bent to form an integral intermediate transverse top bow portion 11 for receiving a cover or top 16. The top portion of the frame is completed by similar longitudinally extending frame bars 12 formed at their ends with downwardly extending portions 12' removably secured to the end bars 9 by bolts 13, and are braced intermediate their length by a transverse reinforcing bar 14 bent upwardly adjacent its ends to form an intermediate bow member, which is removably secured in place by bolts 15.

The frame assembly of the unit D is covered by said top 16. This top is suitably secured to the transverse bows 11, bars or posts 9 and longitudinal bars 12 of the top frame assembly. A suitable securing is effected by tightly bracing the cover to the frame bars.

The top 16 for the unit of this invention is composed of water-proof fabric such as duck, canvas, or the like, the fabric being reinforced by longitudinally extending spaced wooden ribs 17 or the like, which are suitably secured to the underside of the cover or top 16, thereby permitting said top to be rolled longitudinally for shipping or packing.

Also secured to the top frame members 9, 11 and 12 are flexible end curtains 18 and 19, which may be rolled up when not in use, and similar flexible side curtains 23, which also may be rolled up when not in use and which cooperate when unrolled into extended or operative position with the end curtains through the provision of complemental fastening means 20' to form a waterproof compartment on the load-carrying portion of the truck body. The end curtains are wider than the frame assembly so as to form overhanging fastening edges as shown on the drawings. It will be seen, therefore, that the invention provides ready means for converting an open truck into a completely closed vehicle which adequately protects a load of material or passengers from the weather.

It will be understood that the entire assembly, including seat means to be described hereinafter, is sufficiently light in weight so that the unit D may be manually manipulated by a single person.

The end curtains 18 and 19 are provided with aligned window openings that are positioned in the normal line of the rear vision of the truck driver seated in the cab of the truck, so that the driver's rear vision is unobstructed by the presence of said end curtains when they are in use. When not in use, the end curtains 18 and 19 and also the side curtains 23 may be rolled up out of the way and held by retaining fastening means, such as conventional fastening straps 20. The window openings in the end curtains are closed with aligned transparent window panes 21 and 22, which are arranged to provide an unimpeded rear view for the truck driver seated in the truck cab. Said window panes are preferably composed of a suitable flexible waterproof, transparent synthetic "plastic" material, for example, a vinyl plastic, or the like. Therefore, a unit is provided which may be enclosed completely against the weather, so that a watertight protection to the resulting enclosed compartment may be provided. Said side curtains 23 are provided with window panes 24, similar to panes 21 and 22, for enabling viewing through the curtains when they are lowered.

For transporting of passengers, seat members 25 may be provided. These seat members 25 are carried on tubular cantilever frames 26 so as to give the seats comfortable resiliency, and removably secured to the bottom frame members of the unit by bolts 27 and to the seat cleat members 28 by screws or bolts 29, as will be apparent from the drawings.

It will be apparent that the unit D in addition to conversionally functioning with said truck primarily as described, is also by reason of its construction and easy portability adapted to function as a lawn or beach cabana, and the removable seats as lawn, beach or porch seats when removed from the unit.

In operation, the parts are assembled by bolting them together and the fabric top is applied to and suitably connected to the top frame members, as are also the end and side curtains. The assembled unit is simply slid in place on the truck body and held by closing and securing the tail gate. A versatile accessory thus is provided, which is adapted to convert the open body of a light pick-up truck into a closed vehicle for transportation and protection of persons or freight. The structure is amenable to rapid assembly and disassembly, and the body frame of the accessory, being substantially coextensive with the usual load-carrying compartment of a pick-up truck, prevents the accessory from sliding either laterally or longitudinally during operation of the truck. Removal of the seats, therefore accomplishes substantially full freight-carrying capacity of the truck, while enabling the truck to handle cargoes that might be deteriorated by exposure to the elements. Replacement of the seats converts the truck into a passenger-carrying vehicle of a station wagon type. The usual body of the truck is not required to be modified in any way, and as the dimensions thereof are substantially standard, the unit of this invention may be used in connection with light pick-up trucks of any manufacture.

While the invention herein described and illustrated represents a preferred structural embodiment, it will be obvious that structural details may be modified as may be necessary, without departing from the inventive concept; and accordingly it will be understood that it is intended and desired to embrace within the scope of the invention such modifications and changes as may be necessary to adapt it to varying conditions and uses, as defined by the appended claims.

Having thus described my invention, what I desire protected by Letters Patent is as set forth in the following claims.

I claim:

1. A combined canopy and seat construction adapted to be associated with a vehicle body and comprising a bottom frame section including spaced longitudinal tubular bars terminating at their ends in upstanding vertical portions, transverse end members interconnecting the longitudinal bars, and a transverse frame spacer member interconnecting said longitudinal bars spaced from one end member, a canopy supporting top frame section comprising transverse end bow members, said bow members being connected at their ends with downwardly extending vertical bar members constituting corner posts, a longitudinal top side bar connecting the corner posts at each side of the frame, the lower ends of the corner posts telescoping into the ends of the upstanding vertical tubular portions and suitably secured therein, a seat structure supported by and secured to the bottom tubular members at each end of the frame and a seat structure supported by and secured to said spacer member and bottom longitudinal bar structure.

2. A combined knock-down canopy frame and seat construction adapted to be associated with a vehicle body and comprising a bottom frame section including spaced longitudinal tubular bars bent at their ends into upstanding vertical portions, transverse end members interconnecting the longitudinal bars, and a transverse frame spacer member detachably interconnecting said longitudinal bars spaced from one end member, a canopy supporting top frame section comprising transverse end bow members, said bow members being bent at their ends to form downwardly extending vertical tubular bar members constituting corner posts, a longitudinal top side bar detachably connecting the corner posts at each side of the frame, the lower ends of the corner posts telescoping into the ends of the upstanding vertical tubular portions and detachably secured therein, a seat structure supported by and detachably secured to the bottom tubular members at each end of the frame, and a seat structure supported by and detachably secured to said spacer member and the bottom longitudinal bars, and bolt means for securing all detachable connections.

3. A combined canopy frame and seat construction adapted to be associated with a vehicle body and comprising a bottom frame section including spaced longitudinal tubular bars terminating at their ends in upstanding vertical portions, U-shaped transverse end members detachably interconnecting the longitudinal bars, and an intermediate frame means detachably interconnecting said longitudinal bars, a canopy supporting top frame section comprising end bow members, said bow members being connected at their ends with downwardly extending vertical bar members constituting corner posts, a longitudinal top side bar detachably connecting the corner posts at each side of the frame, the lower ends of the corner posts telescoping into the ends of the upstanding vertical tubular portions and detachably secured therein, a seat structure, including a tubular cantilever frame, is detachably mounted on the bottom frame bars at each end of the frame and an intermediate cantilever supported structure detachably mounted on said intermediate frame means, and means securing all detachable connections.

ALFRED T. PITMAN.

References Cited in the file of this patent

UNITED STATES PATENTS

| Number | Name | Date |
|---|---|---|
| 1,538,384 | Crockett et al. | May 19, 1925 |
| 2,173,076 | Stetson | Sept. 12, 1939 |
| 2,324,508 | Johnson | July 20, 1943 |
| 2,463,646 | Schassberger | Mar. 8, 1949 |